United States Patent Office 3,657,208
Patented Apr. 18, 1972

---

3,657,208
TERNARY CATALYST SYSTEMS FOR THE POLYMERIZATION OF CYCLIC OLEFINS
William Allen Judy, Akron, Ohio, assignor to The Goodyear Tire & Rubber Company, Akron, Ohio
No Drawing. Continuation of abandoned application Ser. No. 755,375, Aug. 26, 1968. This application Nov. 2, 1970, Ser. No. 86,002
Int. Cl. C08f 1/14, 7/02, 15/04
U.S. Cl. 260—88.2 R    15 Claims

ABSTRACT OF THE DISCLOSURE

A method for the ring opening polymerization of unsaturated alicyclic compounds containing at least four and not more than five carbon atoms in the cyclic ring and unsaturated alicyclic compounds containing at least eight carbon atoms and at least one double bond in the cyclic ring is disclosed, which comprises subjecting such unsaturated alicyclic compounds to a catalyst system comprising (A) at least one transition metal salt from the group of tungsten halides, tungsten oxyhalides, molybdenum halides and molybdenum oxyhalides, (B) at least one organometallic compound wherein the metal is selected from groups Ia, IIa, IIb, IVa and Va of the Periodic System and (C) at least one Lewis acid of the formula M—$X_n$ where M is a metal from the group of aluminum, zinc, gallium, tin and antimony; X is a halogen and n equals the valence of M.

---

This application is a continuation of Ser. No. 755,375 filed Aug. 26, 1968, now abandoned.

This invention relates to a process for polymerizing unsaturated alicyclic compounds and to the products resulting therefrom. In its broad aspect, the invention is directed to the preparation of polymers derived from unsaturated alicyclic compounds which contain at least one alicyclic ring structure containing at least two carbon atoms connected through a double bond.

The polymerization process of this invention may be used to prepare novel solid polymers. The properties and characteristics can be "tailor made" to fit a wide variety of uses and fields of application. The properties of the polymers resulting from the polymerization process of this invention can be varied over a wide range depending on (1) the particular unsaturated alicyclic monomer chosen to be polymerized, (2) the particular polymerization catalyst employed and (3) the particular polymerization conditions employed. The products resulting from the polymerization of this invention can be employed in a variety of applications; for example, they may be employed to produce finished rubber articles such as pneumatic tires, molded goods and the like or they may be materials which are useful to manufacture articles such as films and fibers. They may also be employed to form finished products by molding techniques.

This invention comprises polymerizing at least one alicyclic compound selected from the group consisting of (1) unsaturated alicyclic compounds containing at least four and not more than five carbon atoms in the cyclic ring and containing one carbon-to-carbon double bond in the cyclic ring, and (2) unsaturated alicyclic compounds containing at least eight carbon atoms in the cyclic ring and containing at least one carbon-to-carbon double bond in the cyclic ring, by subjecting said alicyclic compounds to ring opening polymerization conditions, in the presence of a catalyst comprising (A) at least one transition metal salt selected from a group consisting of tungsten halides, tungsten oxyhalides, molybdenum halides and molybdenum oxyhalides, (B) an organometallic compound selected from a group consisting of Ia, IIa, IIb, IVa and Va of the Periodic Table of Elements and (C) at least one Lewis acid of the formula $MX_n$ where M is a metal selected from a group consisting of aluminum, zinc, gallium, tin and antimony; X is a halogen selected from a group consisting of chlorine, bromine, iodine and fluorine and $n$ is an integer equal to the valence of M.

The Periodic Table of Elements referred to above may be found in the Handbook of Chemistry and Physics, 44th Edition, April 1962 reprinted, page 448, published by the Chemical Publishing Company, Cleveland, Ohio, U.S.A.

Representative examples of the tungsten and molybdenum halides useful as the first or (A) catalyst component of this invention include molybdenum dibromide, molybdenum tribromide, molybdenum tetrabromide, molybdenum trichloride, molybdenum tetrachloride, molybdenum pentachloride, molybdenum hexafluoride, tungsten dibromide, tungsten pentabromide, tungsten hexabromide, tungsten dichloride, tungsten tetrachloride, tungsten pentachloride, tungsten hexachloride, tungsten hexafluoride, tungsten diiodide and tungsten tetraiodide.

Representative examples of the tungsten and molybdenum oxyhalides useful as the first or (A) catalyst component of this invention include molybdenum oxytetrachloride, molybdenum oxytetrafluoride, tungsten oxytetrabromide, tungsten, oxytetrachloride and tungsten oxytetrafluoride. The preferred metal halides and metal oxyhalides are those of tungsten. The most preferred include tungsten hexachloride, tungsten hexafluoride, tungsten oxytetrachloride and tungsten oxytetrafluoride.

Representative examples of metals from which the organometallic compound, the second or (B) catalyst component of this invention, can be derived are lithium, sodium, potassium, rubidium, cesium, beryllium, magnesium, calcium, strontium, barium, zinc, cadmium, mercury, silicone, germanium, tin, lead, arsenic antimony and bismuth. The preferred organometallic compounds are compounds of lithium, sodium, magnesium, tin and zinc.

Representative examples of organometallic compounds useful as the second or (B) catalyst component of this invention are compounds having as the metal component lithium, magnesium, tin and zinc. Representative examples of such compounds include alkyllithiums such as methyllithium, ethyllithium, butyllithium and the like; aryllithiums such as phenyllithium, p-chlorophenyllithium and the like; alkyl tin compounds such as diethyldimethyltin, tetraethyltin, tetraisoamyltin, tetramethyltin and the like; aryltins such as tetraphenyltin, tetra-o-tolyltin, tetra-p-tolyltin and the like; alkylzinc compounds such as dimethylzinc, diethylzinc, diisopropylzinc and the like; and Grignards such as phenylmagnesium bromide and the like. It is usually preferred to employ such compounds as alkyllithium, alkyltin and alkylzinc.

Representative examples of the metals from which the Lewis acid, the third or (C) catalyst component of this invention, can be derived include aluminum, zinc, gallium, tin and antimony. The most preferred metal is that of aluminum.

Representative examples of the Lewis acid, the third or (C) catalyst component employed in this invention include aluminum trihalides such as aluminum trichloride, aluminum tribromide and the like; zinc dihalides such as zinc dichloride, zinc dibromide and the like; gallium trihalides such as gallium tribromide, gallium trichloride, gallium trifluoride and the like; tin tetrahalides such as tin tetrachloride, tin tetrabromide and the like; and antimony pentahalides such as antimony pentachloride, antimony pentabromide and the like. The most preferred Lewis acid compounds are those of aluminum trihalides.

The catalysts employed in this invention are prepared by mixing the components by known techniques. Thus, the catalysts may be prepared by "preformed" or "in situ" techniques. By "preformed" is meant the manner in which the catalyst components are mixed together prior to exposure of any of the catalysts components to the monomer to be polymerized. By "in situ" is meant that the catalyst components are added separately to the monomer to be polymerized. The catalyst components can be mixed either as pure compounds or as suspensions or solutions in liquids which do not adversely effect the ring opening polymerization.

While the presence of the monomer is not essential during the formation of an active catalyst species by mixing of (A), (B) and (C) and this fact facilitates the use of "preformed" catalysts, it has been found that freshly "preformed" catalysts are generally more active than catalysts which have been allowed to age before use.

The amount of catalyst employed may be varied over a wide range of concentrations. Any establishment of an arbitrary catalytic concentration for one of the catalyst components will determine the relative concentrations of the remaining two catalyst components. Thus, the relative concentrations of the catalyst components, (A), (B) and (C), are interdependent. This interdependency of the catalyst components (A), (B) and (C) also depends on a number of other factors such as temperature, reactant used, purity of reactant, reaction times desired and the like. Of course, a catalytic amount, about $5 \times 10^{-5}$ moles, of catalyst must be employed and those skilled in the art will be readily able to determine the optimum catalytic range.

It has been found that successful results are obtained in the practice of this invention when the molar relationship between the catalyst components (A), (B) and (C) as previously defined, are within a molar ratio of $A/B$ ranging from 0.2/1.0 to about 2.0/1.0, a molar ratio of $A/C$ ranging from 0.1/1.0 to about 1.0/1.0, and a molar ratio of $B/C$ ranging from 0.09/1.0 to about 4.0/1.0.

Various unsaturated alicyclic compounds may be employed in the practice of this invention. As is mentioned above, unsaturated alicyclic compounds containing at least 4 and not more than 5 carbon atoms in the cyclic ring which contain one carbon-to-carbon double bond in the cyclic ring and unsaturated alicyclic compounds containing at least 8 carbon atoms in the cyclic ring which contain at least one carbon-to-carbon double bond in the cyclic ring are operable in this invention.

The preferred unsaturated alicyclic compounds of this invention are those comprising a single unsaturated alicyclic ring. These alicyclic rings may be mono- or multi-substituted by such groups as alkyl, aryl, arylalkyl, and halogen groups.

Representative examples of unsaturated alicyclic compounds containing a single alicyclic ring having at least 4 and not more than 5 carbon atoms in the cyclic ring and containing one double bond in said ring are cyclobutene and cyclopentene. Representative examples of compounds having at least 8 carbon atoms in the cyclic ring and having from one to two double bonds in said ring are cyclooctene; 1,4- and 1,5-cyclooctadiene. Representative of compounds having nine carbon atoms and one to three double bonds in the ring are cyclononene, 1,4- and 1,5-cyclononadiene and 1,4,7-cyclononatriene. Representative of compounds having 10 carbon atoms and one to three double bonds in the ring are cyclodecene, 1,4-, 1,5- and 1,6-cyclodecadiene and 1,4,6- and 1,4,7-cyclodecatriene. Representative of compounds having 11 carbon atoms and one to three double bonds in the ring are cycloundecene, 1,4-, 1,5- and 1,6-cycloundecadienes and 1,4,7- and 1,4,8-cycloundecatriene. Representative of compounds having 12 carbon atoms and one to three double bonds in the ring are cyclododecene, 1,4-, 1,5-, 1,6- and 1,7-cyclododecadiene and 1,4,7-, 1,4,8-, 1,4,9- and 1,5,9-cyclododecatriene.

The most preferred unsaturated alicyclic compounds of this invention are those containing from one to three carbon-to-carbon double bonds in the ring and in which the double bonds are located in relation to each other in a manner that they are not adjacent and are non-conjugated. Representative examples of such preferred materials are cyclobutene, cyclopentene, cyclooctene, cyclododecene, and 1,5-cyclooctadiene and 1,5,9-cyclododecatriene.

Still another class of preferred unsaturated alicyclic monomers are those containing one carbon-to-carbon double bond in the ring of at least 4 and not more than 5 carbon atoms, examples of which are cyclobutene and cyclopentene. Another group which are preferred are those which have at least 8 carbon atoms in the ring and not more than 12 carbon atoms in the ring and contain 1, 2, or 3 carbon-to-carbon double bonds in said ring, examples of which are previously set forth.

Representative examples of substituted unsaturated alicyclic compounds are alkyl-substituted compounds such as 1,5,9-trimethylcyclododecatriene; aryl-substituted compounds such as 3-phenylcyclooctene-1; aralkyl-substituted compounds such as 3-benzylcyclooctene-1; alkaryl-substituted compounds such as 3-methylphenylcyclooctene-1; halogen-substituted compounds wherein the halogens are iodine, chlorine, bromine and fluorine such as 5-chlorocyclooctene-1, 3-bromocyclooctene-1, 5 - chlorocyclodo-decene-1, and 5,6-dichlorocyclooctene-1. Mixtures of the unsaturated alicyclic compounds may be polymerized including both substituted unsaturated alicyclic compounds and the unsubstituted unsaturated alicyclic compounds.

The polymerizations of this invention may be conducted in solution or in bulk. When the polymerization is carried out in solution, solvents which do not adversely affect the polymerization are desired. Representative of useful solvents are liquid aromatic hydrocarbons such as benzene and toluene; hydrogenated aromatic hydrocarbons such as Tetralin; liquid aliphatic hydrocarbons such as pentane, heptane, hexane, petroleum ether, decane; and alicyclic hydrocarbons such as cyclohexane, Decalin and cyclooctane. Mixtures of such solvents may also be used.

Temperatures at which the polymerization reaction is carried out can be varied over a wide range. Usually the temperature can be varied from extremely low temperatures such as $-60°$ C. up to high temperatures such as 150° C. or higher. Thus, the temperature is not a critical factor of the invention. It is generally preferred, however, to conduct the reaction at a temperature in the range of from about $-20°$ C. to about 80° C. The pressure at which the polymerization is carried out can also be varied over a wide range. The reaction can be conducted at atmospheric pressure or, if desired, it can be carried out at sub-atmospheric pressure or super-atmospheric pressure. Generally, a satisfactory polymerization is obtained when the reaction is carried out at about autogenous pressure, developed by the reactants under the operating conditions used.

The polymerization time will vary and can range from a few seconds to 24 hours or more, depending upon the polymerization conditions and the degree and extent of polymerization desired.

The polymerization reaction may be carried out as a batch or as a continuous process. In preforming the polymerizations of this invention, the introduction of the monomer, catalyst, and solvent, when a solvent is employed, can each be made to the reaction zone alternately, intermittently, and/or continuously.

It is thought that the polymerizations of this invention take place through a ring-opening polymerization mechanism. Such ring-opening polymerizations of unsaturated alicyclic compounds can be used to make a number of alternating copolymers and terpolymers that have not been capable of being made before. For example, the ring-opening polymerization of cyclooctene yields a polyoctenamer which may be considered the alternating copolymer of one butadiene unit and two ethylene units.

The ring opening polymerization of cyclooctadiene-1,5 leads to a polybutenamer which is equivalent to the 1,4-addition polymer of butadiene-1,3. In practicing this invention, polybutenamers can be formed whose structure comprises alternating cis- and trans-vinylene groups in successive polymeric repeat units which is equivalent to the polymer which may be obtained by the 1,4-addition polymerization of butadiene-1,3 in which successive butadiene-1,3 units alternately occur in cis- and trans-configurations. Such a polymer could be considered an alternating copolymer of cis- and trans-1,4 poly(butadiene-1,3).

The ring opening polymerization of 5-methylcyclooctene-1 would yield the alternating terpolymer of butadiene-1,3, propylene and ethylene; likewise, 5-phenylcyclooctene-1 would yield the alternating terpolymer of butadiene-1,3, styrene and ethylene. The ring opening polymerization of 5-methylcyclooctadiene-1,5 would yield the alternating copolymer of butadiene-1,3 and isoprene. The ring opening polymerization of substituted cyclododecenes can yield even more complicated alternating copolymers, terpolymers, and even quadripolymers.

Ring opening polymerization also allows one to make copolymers and terpolymers that have not heretofore been made by ordinary addition polymerizations. A representative example of such a polymerization is the ring-opening polymerization of cyclononene which yields the perfectly alternating copolymer of butadiene-1,3 and pentamethylene.

Ring opening polymerization of halogen-substituted unsaturated alicyclic monomers also leads to interesting copolymers and terpolymers; for instance, 5-chlorocyclooctene-1 would lead to a polymer equivalent to an alternating interpolymer of butadiene-1,3 plus vinyl chloride and ethylene; 3-bromocyclooctene-1 would yield a polymer equivalent to an alternating interpolymer of ethylene plus 1-bromobutadiene-1,3 and ethylene and 5-chlorocyclododecen-1 would lead to a polymer equivalent to an alternating interpolymer of butadiene-1,3 plus vinyl chloride and 3 ethylene molecules.

Ring opening polymerization of unsaturated alicyclic hydrocarbons containing at least 4 and not more than 5 carbon atoms and containing one carbon-to-carbon double bond in the cyclic ring and those containing 8 carbon atoms and at least one carbon-to-carbon double bond in the cyclic ring produces high molecular weight polymers which have a high degree of resistance to oxidation.

Bulk polymerizations may be desirable from a process standpoint as relatively little heat appears to be evolved per mole of unsaturated alicyclic monomer polymerized in practicing this invention. This constitutes a great advantage for this ring opening type of polymerization over conventional addition polymerization.

The low volume decreases accompanying a ring-opening polymerization is another major advantage over conventional addition polymerization, particularly where these monomers are bulk polymerized to form potting compounds and various articles, examples of which are molded plastic materials, molded rubber-like goods, shoe soles and heels, industrial belts and vehicle tires.

In these applications the monomer may be polymerized in the presence of one or more reinforcing carbon blacks, pigments or resins an certain antioxidants. The products made by this procedure may be crosslinked by adding polymerizable polyfunctional compounds, for example bicyclopentadiene, to the main monomer. The molded products made by ring-opening polymerization may be crosslinked by exposure to ionizing radiation such as gamma rays, X-rays, or electrons. These molded products may also be crosslinked or vulcanized by incorporating certain compounds which on heating during or subsequent to the polymerization will lead to conventional crosslinking or vulcanization of these polymers.

The polymerization reaction may be terminated by incorporating various compounds which, upon heating, release materials which deactivate the catalyst. Representative examples of such compounds are the ammonia salts such as ammonium chloride, ammonium carbonate, ammonium acetate, ammonium oleate, ammonium sulphate, and ammonium phosphate; other ammonia-releasing compounds such as tetraalkyl ammonium halides, e.g., tetramethyl ammonium chloride, water-releasing agents such as salts with water of crystallization, examples of which are: $Al_2(SO_4) \cdot 17H_2O$; $NH_4Al(SO_4)_2 \cdot 12H_2O$;

$$FeSO_4 \cdot 7H_2O$$

$MgHPO_4 \cdot 7H_2O$; $KAl(SO_4)_2 \cdot 12H_2O$; $KNaCO_3 \cdot 6H_2O$; $Na_2B_4O_7 \cdot 10H_2O$; $Na_2CO_3 \cdot 10H_2O$; $NaHPO_4 \cdot 12H_2O$;

$$Na_2SO_4 \cdot 10H_2O$$

and $ZnNO_3 \cdot 6H_2O$.

The following examples are set forth to further illustrate the nature of this invention. However, it should be understood that the examples are set forth for illustrative and not for limitative purposes. All experiments were conducted in an atmosphere of nitrogen unless noted. Column 1 sets forth the experimental number. Columns 2, 3 and 4 set forth the number of moles of $AlCl_3$, $WCl_6$ and organometallic respectively. Column 5 sets forth the order of addition of the catalyst components and column 6 gives the weight percent yield of polymer obtained.

EXAMPLE I

A series of polymerizations were carried out using 17.0 grams (gms.) of freshly distilled cyclooctene and 80 milliliters (ml.) of dried benzene in each polymerization. All manipulations of charging monomer, solvent and catalyst components were conducted under a nitrogen atmosphere. A 0.02 molar (M) solution of tungsten hexachloride ($WCl_6$) in benzene, a 0.10 M solution of butyllithium (BuLi) and a 0.15 M slurry of finely divided aluminum chloride ($AlCl_3$) in benzene, were prepared and employed in the amounts presented in the following table. Termination was accomplished by injecting 5 ml. of a 10 percent by weight solution of ditertiarybutyl-p-cresol in a 50/50 mixture of methanol and benzene.

|  | $AlCl_3$ moles ×10⁴ | $WCl_6$ moles ×10⁴ | Organometallic moles ×10⁴ | Order of addition | Yield, percent |
|---|---|---|---|---|---|
| Experiment No.: |  |  |  |  |  |
| 1 | 3 | 1 | 0.9 | Li→Al→W | 45.9 |
| 2 | 3 | 1 | 1.2 | Li→Al→W | 53.7 |
| 3 | 1.5 | 1 | 1.2 | Li→Al→W | 33.4 |
| 4 | 4.5 | 1 | 0.6 | Li→Al→W | 100.0 |

EXAMPLE II

A series of polymerizations were carried out similar to Example I except that a 0.10 M preformed mixture of $WCl_6$ and $AlCl_3$ in benzene was employed as one of the catalyst components. The relevant data are summarized in the following table.

| | AlCl₃ moles ×10⁴ | AlCl₃ plus WCl₆ mixture moles ×10⁴ | Organo-metallic moles ×10⁴ | Order of addition | Yield, percent |
|---|---|---|---|---|---|
| Experiment No.: | | | | | |
| 1 | 0 | 1 | 1.2 | Li→(W-Al) | 19.1 |
| 2 | 1 | 1 | 2.1 | | 47.8 |
| 3 | 1.5 | 1 | 1.8 | | 52.3 |
| 4 | 2 | 1 | 1.5 | | 51.4 |
| 5 | 3 | 1 | 1.2 | | 61.7 |
| 6 | 5 | 1 | 2.1 | Al→Li→(W-Al) | 91.5 |
| 7 | 9 | 1 | 0.9 | | 95.1 |
| 8 | 9 | 1 | 1.2 | | 98.0 |
| 9 | 9 | 1 | 1.5 | | 99.4 |
| 10 | 9 | 1 | 2.1 | | 100.0 |
| 11 | 9 | 1 | 3.0 | | 95.8 |

EXAMPLE III

A series of polymerizations was carried out similar to Example I except that two additional organometallic compounds were employed. They were 0.10 molar (M) solutions of tetrabutyltin [(Bu)₄Sn] and diethyl zinc [(Et)₂Zn] in benzene. The relevant data are summarized in the table below. The experiment number is given in column 1, column 2 and 3 sets forth the number of moles of AlCl₃ and used respectively, column 3, the number of moles of "preformed" catalyst consisting of WCl₆ and AlCl₃, column 4 sets forth the number of moles of organometallic, column 5, the order of addition and column 6 sets forth the weight percent yield of polymer.

| | AlCl₃ moles ×10⁴ | WCl₆ moles ×10⁴ | Organo-metallic moles ×10⁴ | Order of addition | Yield, percent |
|---|---|---|---|---|---|
| Experiment No.: | | | | | |
| 1 | 1.5 | 1 | (Et)₂Zn, 5.0 | Zn→Al→W | 93.3 |
| 2 | 3.0 | 1 | (Bu)₄Sn, 1.0 | Sn→Al→W | 57.5 |
| 3 | 1.5 | 1 | Bu Li, 1.0 | Al→Li→W | 44.9 |

In another experiment, wherein a preformed catalyst consisting of AlCl₃ and WCl₆ with a mole ratio of Al/W of about 1.0, tetrabutyl tin (1.25×10⁻⁴ moles) was added to 1.0×10⁻⁴ moles of the preformed AlCl₃/WCl₆ to give a polymer yield of 47.7%.

While certain representative embodiments and details have been shown for the purpose of illustrating the invention, it will be apparent to those skilled in the art that various changes and modifications may be made therein without departing from the spirit or scope of the invention.

What is claimed is:

1. A ring-opening polymerization process comprising polymerizing at least one unsaturated alicyclic compound selected from the group consisting of (1) unsaturated alicyclic compounds containing at least four and not more than five carbon atoms in the cyclic ring and containing one carbon-to-carbon double bond in the cyclic ring, and (2) unsaturated alicyclic compounds containing at least eight carbon atoms in the cyclic ring and containing at least one carbon-to-carbon double bond in the cyclic ring, by subjecting said alicyclic compounds to polymerization conditions in the presence of a catalyst system comprising (A) at least one transition metal salt selected from a group consisting of tungsten halides, tungsten oxyhalides, molybdenum halides and molybdenum oxyhalides, (B) at least one organometallic compound wherein the metal is selected from the group consisting of Ia, IIa, IIb, IVa and Va of the Periodic Table of Elements and (C) at least one Lewis acid of the formula $MX_n$ where M is a metal selected from the group consisting of aluminum, zinc, gallium, tin and antimony; X is a halogen selected from the group of bromine, chlorine, iodine and fluorine; and $n$ is an integer equal to the valence of M.

2. A process according to claim 1 in which the molar relationship between the catalyst components defined by (A), (B) and (C) are within the molar ratio of $A/B$ ranging from about 0.2/1.0 to about 2.0/1.0; a molar relationship of $A/C$ ranging from about 0.01/1.0 to about 1/1 and a molar ratio of $B/C$ ranging from about 0.09/1.0 to about 4.0/1.0.

3. A process according to claim 1 in which the transition metal salt is selected from the group consisting of tungsten hexachloride, tungsten hexafluoride, molybdenum pentachloride and molybdenum hexafluoride.

4. A process according to claim 1 in which the transition metal salt is selected from the group consisting of tungsten oxytetrachloride, tungsten oxytetrafluoride, molybdenum oxytetrachloride and molybdenum oxytetrafluoride.

5. A process according to claim 1 in which the organometallic compound is selected from the group consisting of organolithium, organotin and organozinc compounds.

6. A process according to claim 1 in which the Lewis acid is an aluminum halide compound.

7. A process according to claim 1 in which the unsaturated alicyclic compound contains at least four and not more than five carbon atoms and only one carbon-to-carbon double bond in the cyclic ring.

8. A process according to claim 1 in which the unsaturated alicyclic compound contains at least eight and not more than twelve carbon atoms in the cyclic ring and contains from one to three carbon-to-carbon double bonds in the cyclic ring which are located in a relation to each that they are not conjugated.

9. A process according to claim 1 in which cyclooctene is homopolymerized.

10. A process according to claim 1 in which cyclooctadiene is homopolymerized.

11. A process according to claim 1 in which cyclododecatriene is homopolymerized.

12. A process according to claim 1 in which cyclooctadiene and cyclododecatriene are copolymerized.

13. A process according to claim 1 in which polymerization is conducted in bulk.

14. A process according to claim 1 in which polymerization is conducted in solution.

15. A process according to claim 1 wherein the catalyst components (A), (B) and (C) can be employed in situ or preformed before exposure to monomer.

References Cited
UNITED STATES PATENTS

| | | | |
|---|---|---|---|
| 3,074,918 | 1/1963 | Eleuterio | 260—93.1 |
| 3,449,310 | 6/1969 | Dall Asta | 260—93.1 |
| 3,458,489 | 7/1969 | Natta et al. | 260—93.1 |
| 3,459,725 | 8/1969 | Natta et al. | 260—93.1 |
| 3,476,728 | 11/1969 | Natta et al. | 260—93.1 |

JOSEPH L. SCHOFER, Primary Examiner

R. A. GAITHER, Assistant Examiner

U.S. Cl. X.R.

260—93.1